United States Patent [19]

Haight

[11] Patent Number: 5,231,892
[45] Date of Patent: Aug. 3, 1993

[54] HITCH CONTROL INTERFACE ASSEMBLY

[75] Inventor: Robert E. Haight, Waterloo, Iowa

[73] Assignee: Deere & Company, Moline, Ill.

[21] Appl. No.: 915,217

[22] Filed: Jul. 20, 1992

[51] Int. Cl.$^5$ .............................................. B60K 20/00
[52] U.S. Cl. ..................................... 74/523; 338/162; 200/11 TW
[58] Field of Search ................. 200/11 TW; 338/162, 338/163, 172; 74/523

[56] References Cited

U.S. PATENT DOCUMENTS

| | | | |
|---|---|---|---|
| 3,015,793 | 1/1962 | Frazer et al. | 338/162 |
| 3,412,360 | 11/1968 | Colburn | 338/162 |
| 3,427,680 | 2/1969 | Gilbert | 338/162 X |
| 3,469,225 | 9/1969 | Wood | 338/163 |
| 4,190,749 | 2/1980 | Erickson et al. | 200/11 TW |
| 4,405,842 | 9/1983 | Wermelinger | 200/11 TW X |
| 4,518,044 | 5/1985 | Wiegardt et al. | 172/7 |
| 4,795,296 | 1/1989 | Tau | 74/523 X |
| 4,931,967 | 6/1990 | Boe et al. | 364/571.01 |
| 4,969,527 | 11/1990 | Boe et al. | 172/7 |
| 4,979,092 | 12/1990 | Bergene et al. | 364/148 |
| 5,042,314 | 8/1991 | Rytter et al. | 74/523 X |

FOREIGN PATENT DOCUMENTS

| | | | |
|---|---|---|---|
| 1196719 | 7/1970 | United Kingdom | 338/162 |
| 2093676 | 9/1982 | United Kingdom | |

OTHER PUBLICATIONS

JI Case, "Section 8009, Electronic Hitch Alignment", pp. 8009-1 to 8009-10, 1988.
Catapillar, "Challenger 65 Hydraulic System-Specifications-Hitch Control Adjustment", pp. 12 and 13, date unknown.

Primary Examiner—Leslie A. Braun
Assistant Examiner—Khoi Ta

[57] ABSTRACT

An interface assembly includes a housing having a pair of side walls lined to a curved upper surface and the upper surface forms a fore-and-aft extending slot. A shaft is supported by and extends between the side walls. A control member is supported on the shaft and has an outer edge aligned with the slot. A limit member is mounted on the shaft adjacent to the control member and has an outer edge aligned with the slot. The limit member is frictionally coupled to the control member. An stop projects from an outer edge of the limit member. A lever is pivotally mounted on the control member and is releasable engageable with the stop. A transducer is coupled to the control member for generating a signal representing the position of the control member. A thumb wheel and gear may be operated to control rotation of the limit member relative to the housing. A tab projects into the slot and is engageable and disengageable with the tab to limit rotation of the control member relative to the housing.

27 Claims, 4 Drawing Sheets

HITCH CONTROL INTERFACE ASSEMBLY

BACKGROUND OF THE INVENTION

The invention relates to an interface assembly, and particularly, to an interface assembly for a hitch control system.

Hydro-mechanical hitch control systems typically include a rockshaft control lever which requires long motion and high forces. An electro-hydraulic hitch control system is described in U.S. Pat. No. 4,518,044 granted 7 December 1976 to Weigardt et al., and assigned to the assignee of the present application. The hitch control system described therein includes various operator controls such as levers, rotating knobs and switches. Other electronic hitch control systems utilizing switches and levers and knobs coupled to transducers are described in U.S. Pat. No. 4,931,967 issued 5 June 1990, to Boe et al., in U.S. Pat. No. 4,969,527 issued 13, November 1990, to Boe et al., and in U.S. Pat. No. 4,979,092 issued 18 December 1990, to Bergene et al., all assigned to the assignee of the present application. However, none of these references disclose an interface assembly which includes the various hitch control switches, levers, knobs and transducers.

UK patent application GB 2093676 shows a tractor implement hitch control system with knobs and a switch positioned on a flat panel. The motion of such a rotary knob has no obvious relationship to the up-and-down motion of a rockshaft, and thus it is easy for an operator to make mistakes using such a rotary knob.

SUMMARY OF THE INVENTION

An object of this invention is to provide an interface assembly for an electronic hitch control system which includes a rockshaft control lever which has a motion which is logically related to rockshaft movement.

A further object of the invention is to provide such an interface assembly wherein a number of hitch control functions are integrated into a compact assembly.

These and other objects are achieved by the present invention, wherein an interface assembly includes a housing having a pair of side walls joined to a curved upper surface and the upper surface forms a fore-and-aft extending slot. A shaft is supported by and extends between the side walls. A control member is supported on the shaft and has an outer edge aligned with the slot. A stop member is mounted on the shaft adjacent to the control member and has an outer edge aligned with the slot. The stop member is frictionally coupled to the control member. An stop projects from an outer edge of the stop member. A lever is pivotally mounted on the control member and releasably engages with the stop. A transducer is coupled to the control member for generating a signal representing the position of the control member. A thumb wheel and gear may be operated to control rotation of the stop member relative to the housing. A tab projects into the slot and is engageable and disengageable with the tab to limit rotation of the control member relative to the housing

DETAILED DESCRIPTION

Figure 1:
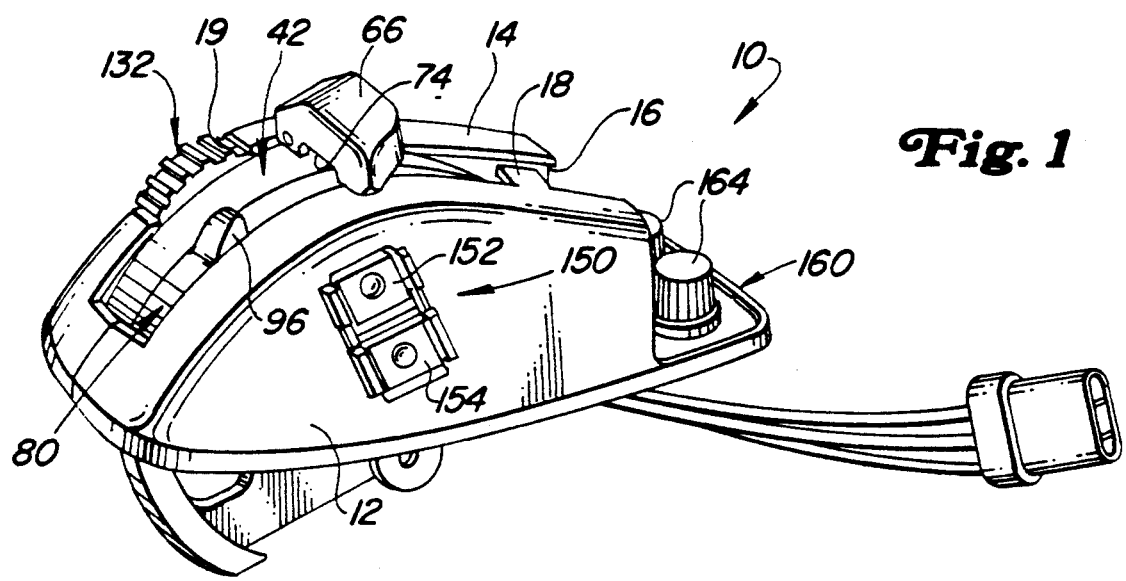
FIG. 1 is a perspective view of an interface assembly for a hitch control system according to the present invention.
Figure 2:
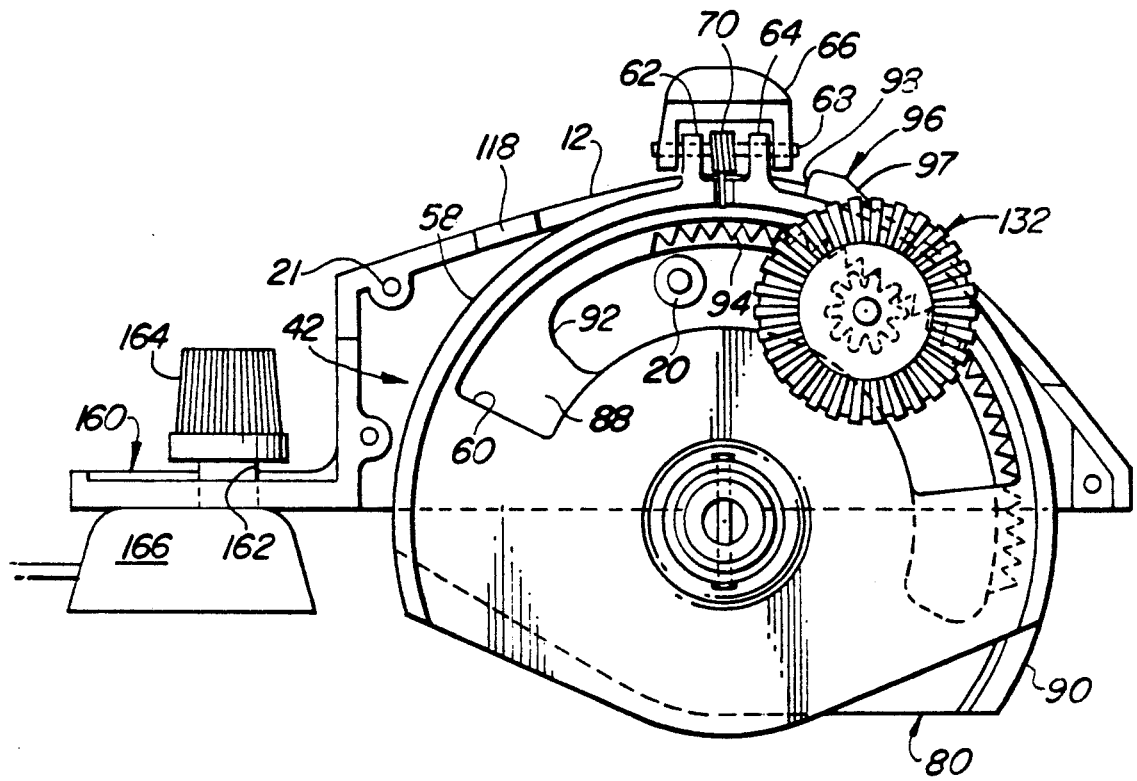
FIG 2 is an elevational view of the left half of the present invention with the right housing removed.
Figure 3:
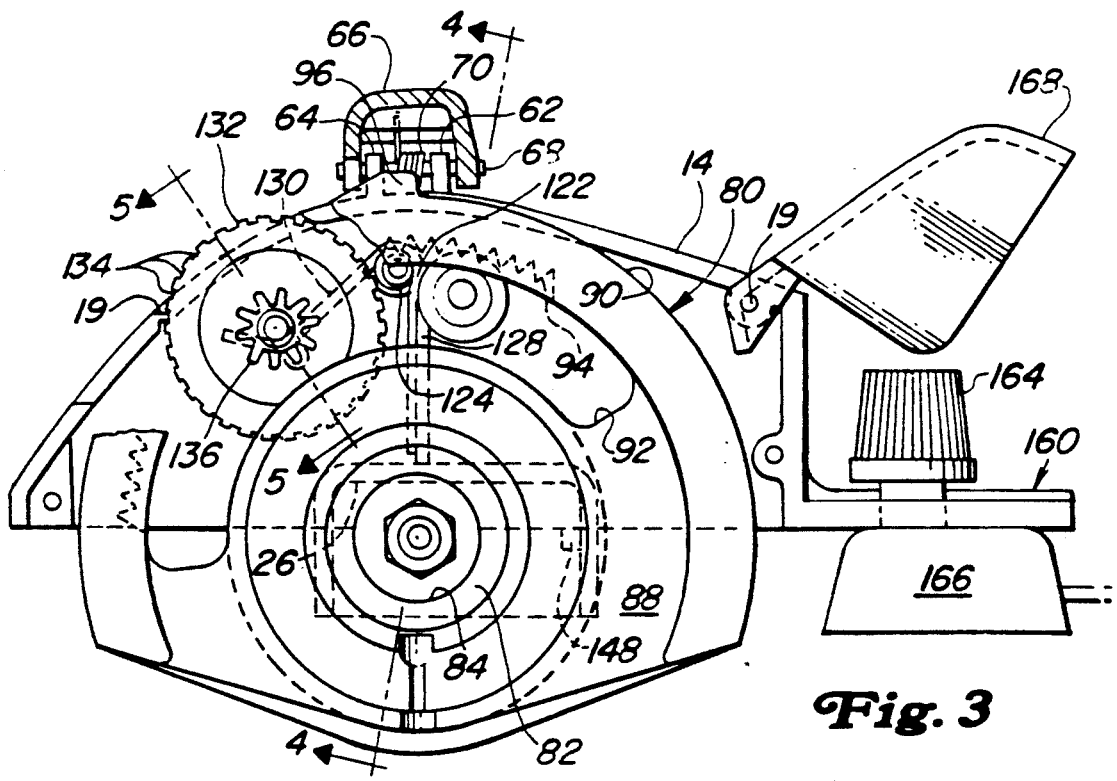
FIG. 3 is an elevational view of the right half of the present invention with the left housing removed.
Figure 4:
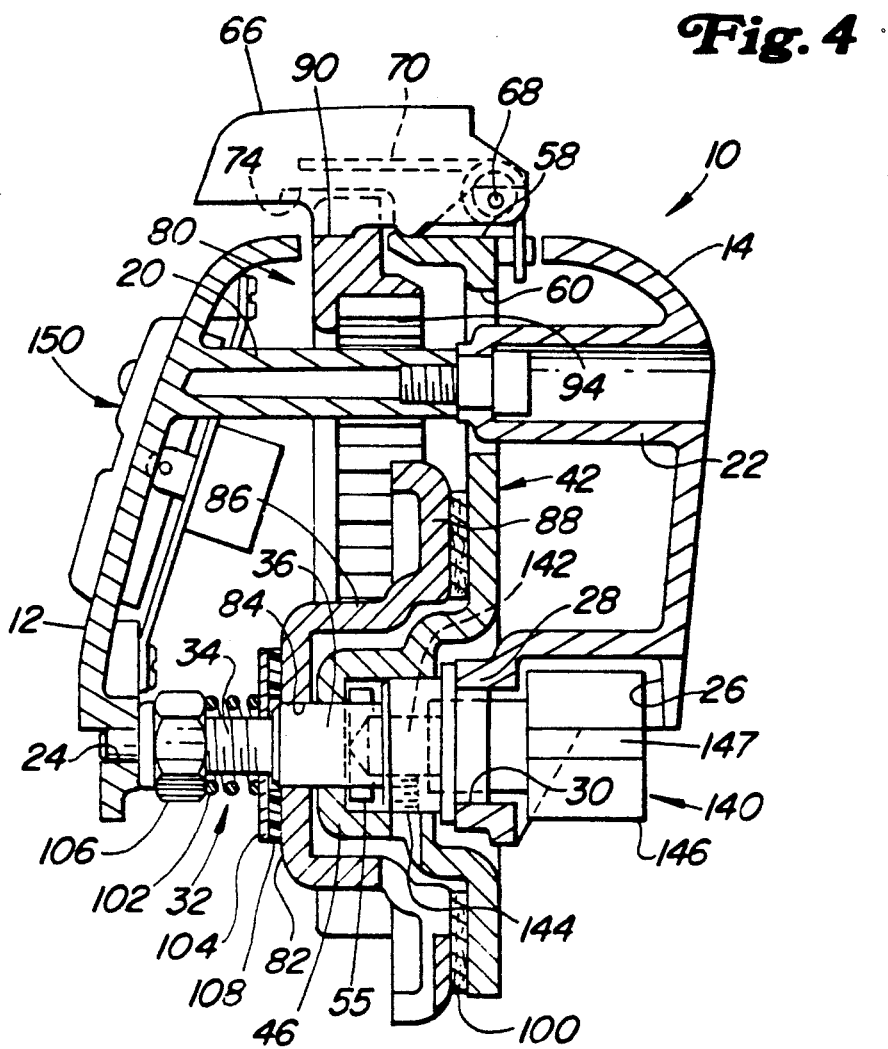
FIG. 4 an elevational cross section view taken along line 4—4 of FIG. 3.
Figure 5:
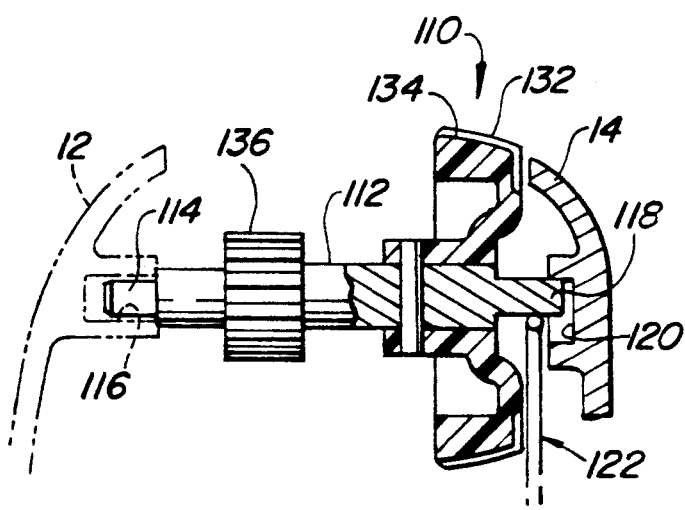
FIG. 5 is an elevational cross section view taken along line 5—5 of FIG. 3.

Referring to FIGS. 1 and 4, an interface assembly 10 for a hitch control system (not shown) includes a left or inner housing 12 and a right or outer housing 14. The housings 12 and 14 are smoothly curved and fitted together to form a slot 16. The left housing 12 forms a tab 18 which projects into the slot 16 near its rear end. The right housing 14 forms a slot 19 which opens into the slot 16. The housings also form hollow posts 20 and 22 which project towards each other. The housings are rigidly attached to each other by a bolt which is received in post 22 and which is screwed into post 20.

Pins and bores on the housings help to properly orient the housings with respect to each other. A lower central part of housing 12 forms a bore 24. A lower central part of housing 14 forms a rectangular recess 26, a hub 28 and a bore 30. The axis of bores 24 and 30 are aligned with each other. Portions of the outer periphery of housings 12 and 14 are substantially cylindrical with respect to the axis of bores 24 and 30. Pivot posts 29 and 31 project into the slot 16 at the rear end thereof.

Figure 6:
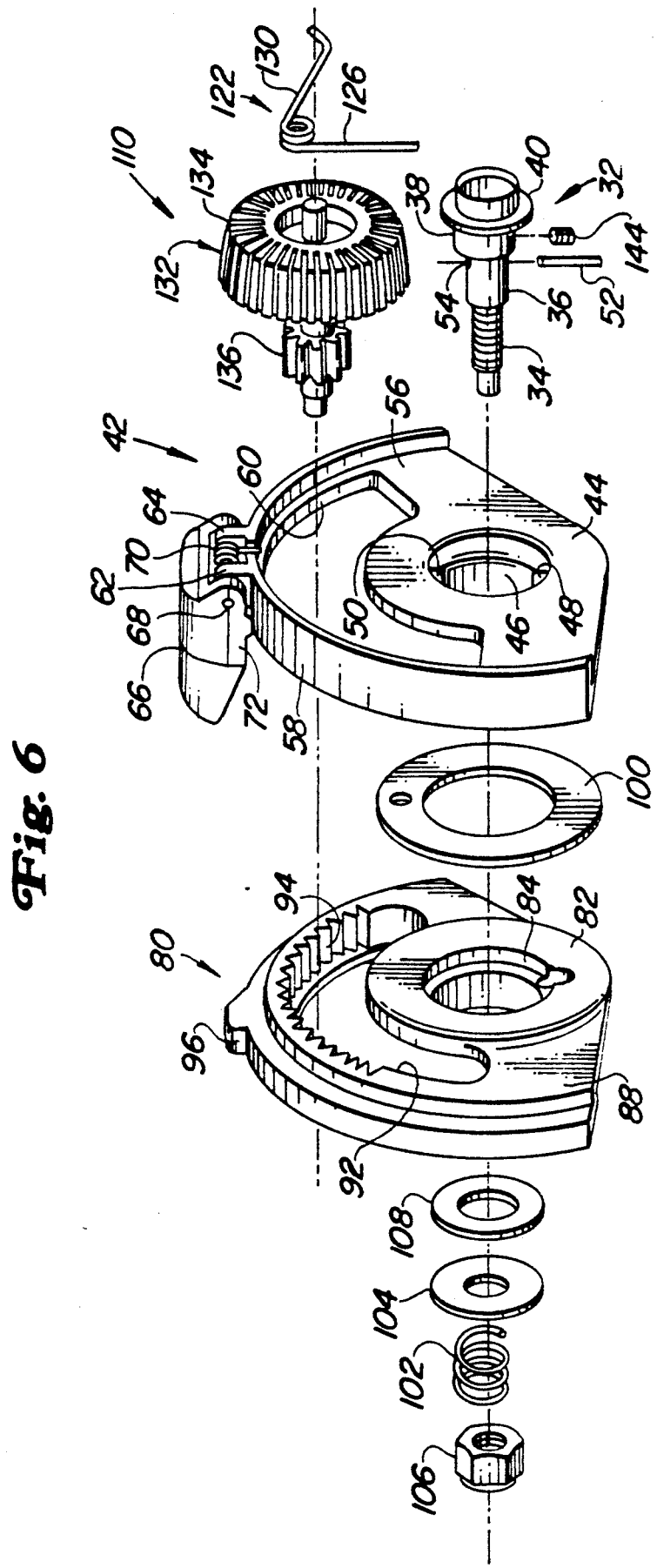
FIG. 6 is an exploded isometric view showing the arrangement of the rotational parts of the present invention.

As best seen in FIGS. 4 and 6, bore 24 rotatably receives an end of a shaft 32. Shaft 32 includes a threaded section 34, a cylindrical shaft portion 36, a larger diameter shaft portion 38 and an cylindrical flange 40 positioned on shaft portion 38. Shaft portion 38 is hollow and its end is internally chamfered.

A rockshaft control wheel 42 is mounted on the shaft 32 for rotation therewith. Wheel 42 includes a central portion 44 with an axially extending hollow hub 46. A pair of notches 48 and 50 are formed on opposite sides of the interior of the hub 46. A pin 52 extends through a radial bore 54 in shaft 36 and has ends which are received in the notches 48 and 50 so that the wheel is coupled to shaft 32 for rotation therewith. Wheel 42 also includes a disk portion 56 which supports a partially cylindrical outer flange 58 which extends through approximately 218 degrees. A curved slot 60 extends through the disk 56 and receives post 20 so that wheel 42 can be rotated with respect to the housings 12 and 14.

A pair of tabs 62, 64 project outwardly from the flange 58. A lever or stop device 66 is pivotally coupled to the tabs 62, 64 by a pin 68. A spring 70 urges the lever towards the position shown in FIGS. 1 and 6, and the lever may be manually pivoted clockwise, viewing FIGS. 4 and 6. The lever 66 has a rear side wall 72 which is engageable with tab 18. The front side wall of lever 66 forms a recess 74.

Also mounted on shaft 36 is a stop adjustment wheel or limit member 80. Wheel 80 has a hub 82 with a central bore 84 which rotatably receives the shaft 36, a cylindrical portion 86, a disk portion 88 and an outer flange 90 (which also extends through approximately 218 degrees). A curved slot 92 extends through the disk 88 and receives post 20 so that wheel 80 can be rotated with respect to the housings 12 and 14. Teeth 94 extend along the radially inwardly facing surface of slot 92. A stop or abutment 96 projects outwardly from the flange 90. Stop 96 has a radially extending rearward facing abutment surface 98 and a sloping surface 97 which extends from the outer end of surface 98 to where it merges smoothly with the cylindrical outer surface of wheel 80.

An annular friction washer 100 is held between the wheels 42 and 80. Wheels 42 and 80 and washer 100 are pressed against each other by a coil spring 102 which is mounted on the shaft 34 between a washer 104 and tension adjusting nut 106. A low friction plastic washer 108 is mounted between washer 104 and wheel 80. The frictional coupling between the wheels 80 and 42 is such that when wheel 80 is turned, the wheel 42 will rotate with it.

The rotation of wheel 80 is controlled by an operator control knob 110. Control knob 110 includes a shaft 112 which has an end 114 which is rotatably received in a bore 116 which is formed on the interior of housing 12. The other end 118 of shaft 112 is received in a slot 120 which is formed on the interior of housing 14 and which extends in a radial direction with respect to the axis of rotation of wheels 42 and 80. A spring 122 has a coil which is mounted on a post 124 formed on the interior of housing 14, a first arm 126 which engages a wall 128 formed on the interior of housing 14 and a second arm 130 which engages the end 118 of shaft 112. A thumb wheel 132 is fixed to the shaft 112 and has a set of axially extending grooves 134 formed on its outer periphery. A gear wheel 136 is fixed on shaft 112 for meshing engagement with the teeth 94 of wheel 80. The spring 122 is biassed to urge shaft 112 towards the radial outer end of slot 120 and to urge stop thumb wheel 132 into engagement with the edges of slot 19 so that the housing 14 will normally engage the grooves 134 and prevent rotation of the control knob 110. Thus, to rotate the gear 136 and wheel 80, the thumb wheel 132 must be depressed against the bias of spring 122 so that the grooves 134 are disengaged from the housing 114.

The wheels 42 and 80 are dimensioned so that the flanges 58 and 90 are received by the slot 16 formed between the housings 12 and 14, and so that the outer surfaces of flanges 58 and 90 are at or slightly below the outer surfaces of the housings 12 and 14.

A potentiometer 140 has a shaft 142 which is received in the hollow shaft portion 38 and is fixed for rotation therewith by set screw 144. The potentiometer 140 may be a commercially available potentiometer such as a Bourns #96Z1Z-ZZZ-EAO/174 and preferably includes a rectangular housing 146 which is non-rotatably mounted in rectangular recess 26 of housing 14. Thus, the shaft of potentiometer 140 rotates when the wheel 42 rotates and can provide a signal to a hitch control system (not shown) representing the position of the rockshaft control wheel 42. The rectangular housing 146 preferably includes a notch 147 which receives a corresponding tab 148 on the housing 14 so that the potentiometer 140 may be properly oriented and prevented from rotating in the recess 26.

A switch 150 is mounted in a rectangular opening on the side of housing 12. Switch 150 is preferably a commercially available spring centered momentary contact rocker switch with an upper switch member 152 and a lower switch member 154. Switch 150 is preferably connected by wires (not shown) to a control system (not shown) so the depressing upper switch member 152 will cause the hitch (not shown) to raise and so that depressing lower switch member 154 will cause the hitch (not shown) to lower. The switch 150 is positioned so that it can be conveniently operated by the thumb if the right hand of an operator is positioned over the interface assembly 10. Preferably, the switch 150 may be utilized as a raise/lower switch such as is described in U.S. Pat. No, 4,969,527, issued 13 November 1990 to Boe et al., and assigned to the assignee of the this invention.

The rear ends of housings 12 and 14 form a shelf 160. A pair of bores 162 extend through shelf 160 for receiving the shafts of control knobs 164 which may be connected to control potentiometers 166. A housing cover 168 may be pivotally mounted on pivot pins 29 and 31 so that it can be placed over the control knobs 164 when they are not in use and lifted when control knobs 164 are to be used.

The interface assembly 10 is preferably mounted in the cab or operator compartment (not shown) of an agricultural tractor (not shown) in a location where it is readily available for manipulation by the operator.

MODE OF OPERATION

The lever 66 can be pivoted upwardly so that the rockshaft control wheel 42 can be rotated clockwise (viewing FIG. 1) until the lever 66 passes over the raise tab 18. The lever 66 may then be released and the tab 18 will hold the rockshaft control wheel 42 in a transport lock position. When the wheel 42 is in this position, the signal from the potentiometer 140 may be utilized by the hitch control system (not shown) as a command to fully raise the hitch (not shown) during transport.

Moving the lever 66 forward rotates the rockshaft control wheel 42 counterclockwise and the corresponding signal from the potentiometer 140 may be utilized by the hitch control system (not shown) as a command to lower the hitch (not shown) during field operation. An adjustable limit to the forward motion of the lever 66 and wheel 42 is provided by the stop or stop 96 which projects from wheel 80 and which will engage the lever 66 as the rockshaft control wheel 42 rotates counterclockwise. The lever 66 can be pivoted upwardly so that it can pass over and move past the stop 96 as the rockshaft control wheel 42 is rotated counterclockwise (viewing FIG. 1).

If the lever 66 is forward (to the left viewing FIG. 1) of the stop 96, then lever 66 may be moved rearward and when the lever 66 reaches the stop 96 the sloping surface 97 will engage the lever 66 and automatically pivot and raise the lever 66 over the stop 96. This allows an operator to easily move the lever 66 rearward without having to move the wheel 80.

The position of wheel 80 and of stop 96 can be set by depressing and rotating the thumb wheel 132. When released, the thumb wheel locks in position due to its engagement with the edges of slot 19. Small adjustment of rockshaft control wheel 42 (operating depth) can be easily accomplished by placing the rockshaft lever 66 against the stop 96, and then adjusting the stop 96 by depressing and rotating the thumb wheel 132. Unless the lever 66 is held in the transport lock position by tab 18, the lever 66 will follow the stop 96 in both directions because of the frictional coupling between wheels 42 and 80.

If an operator desires to raise the hitch (not shown) while the tractor (not shown) is turning and then return it to the original depth, the operator can use the switch 150 rather than the control lever 66. With the lever 66 in the operating position, the depressing and releasing the upper end 152 of the switch 150 may be utilized by the hitch control system (not shown) as a command to raise the hitch (not shown), while depressing and releasing the lower end 154 of the switch 150 may be utilized by the hitch control system (not shown) as a command to lower the hitch (not shown) and return it to its previous position.

The cover 168 over the rear portion of the control assembly 10 can be pivoted and lifted upward and forward to expose the control knobs 164. One knob may be used to adjust an implement "rate of drop" signal, while the other may be used to establish a maximum height signal.

The size and shape of the control assembly 10 makes it a convenient handrest during routine field operation, and a handhold to help stabilize the operator in rough terrain. Having the Up-Down switch 150 integrated into the side of the housing 12 insures easy location under all operating conditions.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. An interface assembly comprising:
   a housing having a pair of side walls joined to an outwardly convex cover wall, the cover wall having a fore-and-aft extending slot therein;
   a limit member mounted in the housing and having an outer portion aligned with the slot, the limit member having an abutment surface formed thereon;
   a second member mounted in the housing adjacent to the portion limit member and having an outer portion aligned with the slot, the second member having a stop device mounted thereon, the stop device being movable to engage with and disengage from the abutment surface, the abutment surface being engageable with the stop device to limit movement of the second member relative to the limit member; and
   a transducer coupled to the second member for generating a signal representing the position of the second member.

2. The interface assembly of claim 1, further comprising:
   means for frictionally coupling the second member to the limit member so that rotation of the limit member will cause the second member to rotate.

3. The interface assembly of claim 1, further comprising:
   means for manually controlling rotation of the limit member relative to the housing.

4. The interface assembly of claim 1, wherein:
   a tab projects from a side wall of the slot; and
   the stop device is engageable and disengageable with the tab to limit rotation of the second member relative to the housing.

5. The interface assembly of claim 3, wherein the means for manually controlling rotation of the limit member comprises:
   a set of gear teeth formed on the limit member;
   a control shaft rotatably supported by the housing, the control shaft carrying a spur gear which meshes with the gear teeth on the limit member and carrying an operator rotatable control knob.

6. The interface assembly of claim 5, wherein the housing has a recess which opens into the slot, the control knob being received by the recess in a position adjacent to one of the first and second members.

7. The interface assembly of claim 5, wherein:
   the control shaft has a first end rotatably received in a bore in one side wall of the housing and a second end rotatably and slidably received in a slot in the other side wall of the housing so that the control shaft is pivotal about its first end; and
   a spring is coupled between the housing and the control shaft, the spring being biassed to releasably hold the knob in engagement with an edge of the recess to prevent unintentional rotation thereof.

8. The interface assembly of claim 5, wherein:
   a control shaft is supported by and extends between the side walls; and
   the second member and the limit member each has a slot therein through which extends the control shaft.

9. The interface assembly of claim 1, wherein:
   a main shaft is supported by and extends between the side walls; and
   the second member is fixed for rotation with the main shaft; and
   the transducer comprises a rotary potentiometer having a shaft fixed for rotation with the main shaft.

10. The interface assembly of claim 1, wherein:
    a main shaft is supported by and extends between the side walls, the first and second members being mounted on the main shaft; and
    a spring is mounted on the main shaft between the limit member and a side wall of the housing, the spring being biassed to urge the limit member towards the second member.

11. The interface assembly of claim 1, wherein the housing forms a shelf which projects from an end of the cover wall, the shelf supporting a control device.

12. The interface assembly of claim 11, wherein a shelf cover for covering the shelf is pivotally coupled to the housing.

13. The interface assembly of claim 1, wherein the limit member has a ramp surface which extends from an edge of the abutment surface to an outer peripheral surface of the limit member, the stop device being slidably engageable with the ramp surface and movable past the abutment surface as the second member moves in one direction with respect to the limit member.

14. An interface assembly comprising:
    a housing having a curved cover wall joined to a pair of laterally spaced apart side walls, the cover wall having a fore-and-aft extending slot therein;
    a main shaft supported by and extending between the side walls;
    a control member supported on the main shaft and having an outer portion aligned with the slot;
    a limit member mounted on the main shaft adjacent to the control member and having an outer portion aligned with the slot, the limit member having an abutment projecting therefrom;
    a lever pivotally mounted on the control member and releasable engageable with the abutment; and
    a transducer coupled to the control member for generating a signal representing the position of the control member.

15. The interface assembly of claim 14, further comprising:

means for manually controlling rotation of the limit member relative to the housing; and means for frictionally coupling the control member to the limit member.

16. The interface assembly of claim 14, wherein:

a tab projects from a side wall of the slot; and the lever is engageable and disengageable with the tab to limit rotation of the control member relative to the housing.

17. The interface assembly of claim 14, wherein the means for manually controlling rotation of the limit member comprises:

a set of gear teeth formed on the limit member;

a control shaft carrying a spur gear which engages the gear teeth on the limit member and carrying an operator rotatable control knob.

18. The interface assembly of claim 17, wherein:

the housing has a recess which opens into the slot, the control knob being received by the recess;

the control shaft has a first end rotatably received in a bore in one side wall of the housing and a second end rotatably and slidably received in a slot in the other side wall of the housing so that the control shaft is pivotal about its first end; and a spring is coupled between the housing and the shaft, the spring being biassed to releasably hold the knob in engagement with an edge of the recess to prevent unintentional rotation thereof.

19. The interface assembly of claim 17, wherein the control member and the limit member each has a slot therein through which extends the control shaft.

20. The interface assembly of claim 14, wherein:

the control member is fixed for rotation with the main shaft; and the transducer comprises a rotary potentiometer having a shaft fixed for rotation with the main shaft.

21. The interface assembly of claim 14, further comprising:

a spring mounted on the main shaft between the limit member and a side wall of the housing, the spring being biassed to urge the limit member towards the control member.

22. The interface assembly of claim 14, wherein the housing forms a shelf which extends to the rear of the upper surface, the shelf supporting a control device.

23. The interface assembly of claim 12, wherein a cover for covering the shelf is pivotally coupled to the housing.

24. An interface assembly comprising:

a housing having a pair of side walls joined to a curved cover wall, the cover wall having a fore-and-aft extending slot therein;

a shaft having ends rotatably supported by the side walls and extending laterally between the side walls;

a first wheel rotatably mounted on the shaft and having an outer portion aligned with the slot, the first wheel having an abutment part projecting from the outer portion thereof;

a second wheel fixed for rotation with the shaft adjacent to the first wheel and having an outer portion aligned with the slot;

a control part mounted on the second wheel, the control part being engageable and disengageable with the abutment part;

means for frictionally coupling the second wheel to the first wheel;

means for controlling rotation of the first wheel relative to the housing; and a transducer coupled to the second wheel for generating a signal representing the position of the second wheel.

25. The interface assembly of claim 24, wherein the control part comprises a lever pivotally mounted on the second wheel.

26. The interface assembly of claim 24, wherein a stop tab projects from a side wall of the slot, the control part being engageable and disengageable with the stop tab.

27. The interface assembly of claim 24, wherein the means for controlling rotation of the first wheel relative to the housing comprises a thumb wheel rotatably mounted adjacent to one of the first and second wheels and means for coupling the thumb wheel to the first wheel.

* * * * *